US007818223B1

(12) United States Patent
Campbell et al.

(10) Patent No.: US 7,818,223 B1
(45) Date of Patent: Oct. 19, 2010

(54) STATEMENT NOTIFICATION SYSTEM

(75) Inventors: Maxine H. Campbell, Lancaster, SC (US); Greg L. Verego, Charlotte, NC (US)

(73) Assignee: Amdocs BCS, Inc., Chesterfield, MO (US)

( * ) Notice: Subject to any disclaimer, the term of this patent is extended or adjusted under 35 U.S.C. 154(b) by 1239 days.

(21) Appl. No.: 10/956,936

(22) Filed: Oct. 1, 2004

(51) Int. Cl.
*G07F 19/00* (2006.01)

(52) U.S. Cl. ............... 705/34; 705/7; 705/14; 705/26; 705/35; 705/39; 705/40; 705/44

(58) Field of Classification Search ............ 705/34
See application file for complete search history.

(56) References Cited

U.S. PATENT DOCUMENTS

| | | | | |
|---|---|---|---|---|
| 5,852,812 A | * | 12/1998 | Reeder | 705/39 |
| 5,893,077 A | * | 4/1999 | Griffin | 705/34 |
| 5,963,925 A | * | 10/1999 | Kolling et al. | 705/40 |
| 6,115,690 A | * | 9/2000 | Wong | 705/7 |
| 6,535,868 B1 | * | 3/2003 | Galeazzi et al. | 707/2 |
| 6,968,319 B1 | * | 11/2005 | Remington et al. | 705/40 |
| 7,117,170 B1 | * | 10/2006 | Bennett et al. | 705/34 |
| 2002/0026394 A1 | * | 2/2002 | Savage et al. | 705/34 |
| 2002/0169664 A1 | * | 11/2002 | Walker et al. | 705/14 |
| 2003/0055783 A1 | * | 3/2003 | Cataline et al. | 705/40 |

OTHER PUBLICATIONS

McKie, Stewart. ERP Meets Web E-Commerce. DBMS, vol. 11, No. 8, p. 39(1), Jul. 1998.*

* cited by examiner

*Primary Examiner*—F. Zeender
*Assistant Examiner*—Fawaad Haider
(74) *Attorney, Agent, or Firm*—Brinks Hofer Gilson & Lione

(57) ABSTRACT

Disclosed herein are methods and systems for preparing customer billing statements. In one embodiment, a method for preparing customer billing statements includes acts of retrieving information for a customer from a customer database; retrieving a set of notification rules; identifying a notification rule that applies to the information for the customer; linking the identified notification rule with a charge description; and generating a billing statement for the customer, where the billing statement includes the charge description.

14 Claims, 7 Drawing Sheets

STATEMENT NOTIFICATION SYSTEM

BACKGROUND OF THE INVENTION

1. Technical Field

The present invention relates, generally, to techniques for generating automated reports, and particularly to the automated preparation of customer statements with customized notifications.

2. Background Information

Information processing centers handle an increasing amount of data, such as medical records, customer information, inventory information, delivery information, warehousing records, and billing information, among others. At the same time, many industries are consolidating resources to handle more efficiently the growing demands of information processing. Resources may be consolidated in to centralized processing centers that handle the needs of a single company or of a group of client companies.

Processing centers have been expanding to manage growing volumes of information for client databases, and can benefit from ongoing improvements in both hardware and software. Developments in semiconductor processing and component design have provided efficient systems for storing and processing large amounts of information. However, these advances in hardware often outpace developments in the software needed to manage the information.

As one example, past approaches to processing customer data (e.g., preparing invoices) generally relied upon inflexible hardcoded processing steps. While improved software may capture the desired processing steps at the time the software was written, its hardcoded nature may make the software inflexible, and in some cases, unsuitable for the customer at a later date. With such software, the customer may initiate changes, if at all, through an expensive, time consuming re-programming process in which a software vendor's programmer customizes the software to suit customer specifications.

Even when a customer is willing to incur the expense and delay, the customized software may still have further drawbacks. As an example, with every custom software release comes the need for individuals to track, understand, and support the revised software. Additionally, the updated software may need to be revised to include the specific customizations for individual customers. Consequently, custom software may increase the costs for the software vendor as well as introduce delay and inconvenience to customers.

BRIEF SUMMARY

Methods and systems consistent with the invention provide an adaptable, modifiable, and sophisticated invoice generation method using flexible implementation and revision of billing rules. For example, billing rules that would previously be implemented by customizing software used in generating invoices may instead be implemented using graphical user interfaces.

Disclosed herein are techniques for preparing billing statements for distribution to customers of a service provider. The service provider may be, for example, a telecommunications services provider such as a cable television provider, a satellite television provider, a telephone service provider, or an internet services provider. The techniques presented here may be adapted to a wide range of other services. For example, these techniques may be applied to the billing systems for various providers of subscription services, including magazine publishers, insurance providers, or technical-support providers, among others.

DETAILED DESCRIPTION

Figure 1:
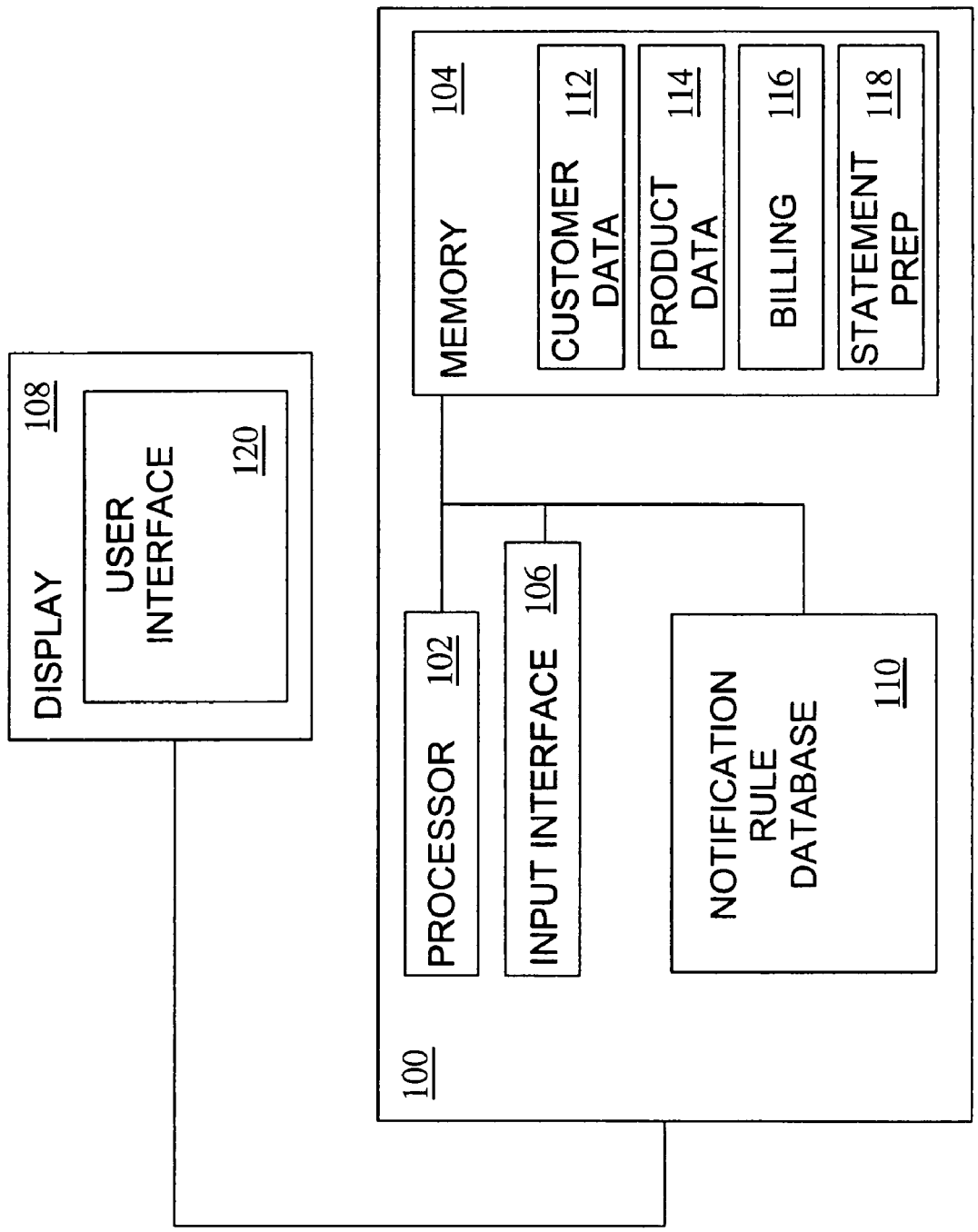
FIG. 1 shows a data processing system that applies an extensible statement notification system.

FIG. 1 shows a data processing system 100 that applies an extensible statement notification system. The data processing system 100 includes a processor 102, a memory 104, and an input interface 106. The data processing system 100 further includes a display 108 and a notification rule database 110.

The memory 104 stores data, for example customer data 112 and product data 114, and programs. Various programs used by the data processing system 100 may be stored in the memory 104, such as a billing software 116, and a statement preparation software 118. A user interface 120 assists an operator to design and modify notification rules that may be stored in the notification rule database 110.

The elements illustrated in FIG. 1 operate together as explained in more detail below. Before setting forth any additional explanation, however, it is noted that all of the discussion below, regardless of the particular implementation being described, is exemplary in nature, rather than limiting. For example, although selected aspects, features, or components of the implementations are depicted as being stored in the memory 104 and notification rule database 110, all or part of systems and methods consistent with the present invention may be stored on or read from other machine-readable media, for example, secondary storage devices such as hard disks, floppy disks, and CD-ROMs; a signal received from a network; or other forms of machine readable memory either currently known or later developed.

Furthermore, although for discussion purposes specific components of the data processing system 100 will be described, a variety of methods, systems, and articles of manufacture consistent with the statement notice technology may include additional or substitute different components. For example, the processor 102 may be a microprocessor, microcontroller, application specific integrated circuit (ASIC), discrete logic, or a combination of other types of circuits acting as explained below. Similarly, the memory 104 may be DRAM, SRAM, flash, or any other type of memory. The notification rule database 110 may be separately stored and managed, split into multiple databases, and generally logically and physically organized in many different ways. Furthermore, the notification rule database 110 may more generally represent data files searchable using techniques such as relational database queries, for example, or other search methods. The individual programs discussed below may be parts of a single program, separate programs, program libraries, or distributed across several memories and processors. A variety of implementations are possible for the various programs. For example, the programs may be created in a variety of languages, such as C, C++, Java, or others, using a variety of programming architectures, including interpreted, compiled, or JIT translations. The software may be configured to run on a variety of operating systems, such as Unix®, Linux®, Windows®, MacOS®, and others.

Many providers of subscription services offer some degree of customization to their customers. For example, a cable television provider may provide a variety of different service options to a wide variety of customers. The different service options may include various programming packages, price incentives, bonuses, temporary samples, and contract durations, for example. The service options may vary among various markets, since television programming varies from city to city. The service options may vary among subscribers, since different subscribing customers may select different programming packages, each of which may include different combinations of television channels. The service options may also vary in time. As the provider becomes able to provide new service options, as the provider becomes unable to continue obsolete options, and as the provider's marketing plans evolve in response to changing customer needs and changes in available programming, the provider may elect to change the products and pricings offered to its customers. The provider may wish to alert customers of such upcoming changes in products and pricing.

Similar changes may also occur in other types of subscription services. For example, a magazine publisher may need to alert a subscriber to a temporary incentive for renewing a subscription that is about to expire. An insurance company may need to alert a customer of an upcoming change in the rate for one of the various components of the customer's insurance policy. An interne service provider may need to announce that a per-megabyte charge will be eliminated as of a certain date in the future, or that a temporary incentive that the custom has been enjoying (eg: "free DSL for six months") is about to expire after two more billing cycles.

As changes occur in subscription services, therefore, a provider may need to alert appropriate subscribers of the changes in their subscription services. The alerts may be communicated in letters, emails, voice messages, phone calls by customer representatives, or other automated or non-automated communications. One efficient approach for providing customer notifications is to include the notifications with billing statements. Since providers may transmit billing statements on a regular basis, including the customer notifications with the billing statements can be a low-cost way to provide customers with convenient, consolidated notifications.

Figure 2:
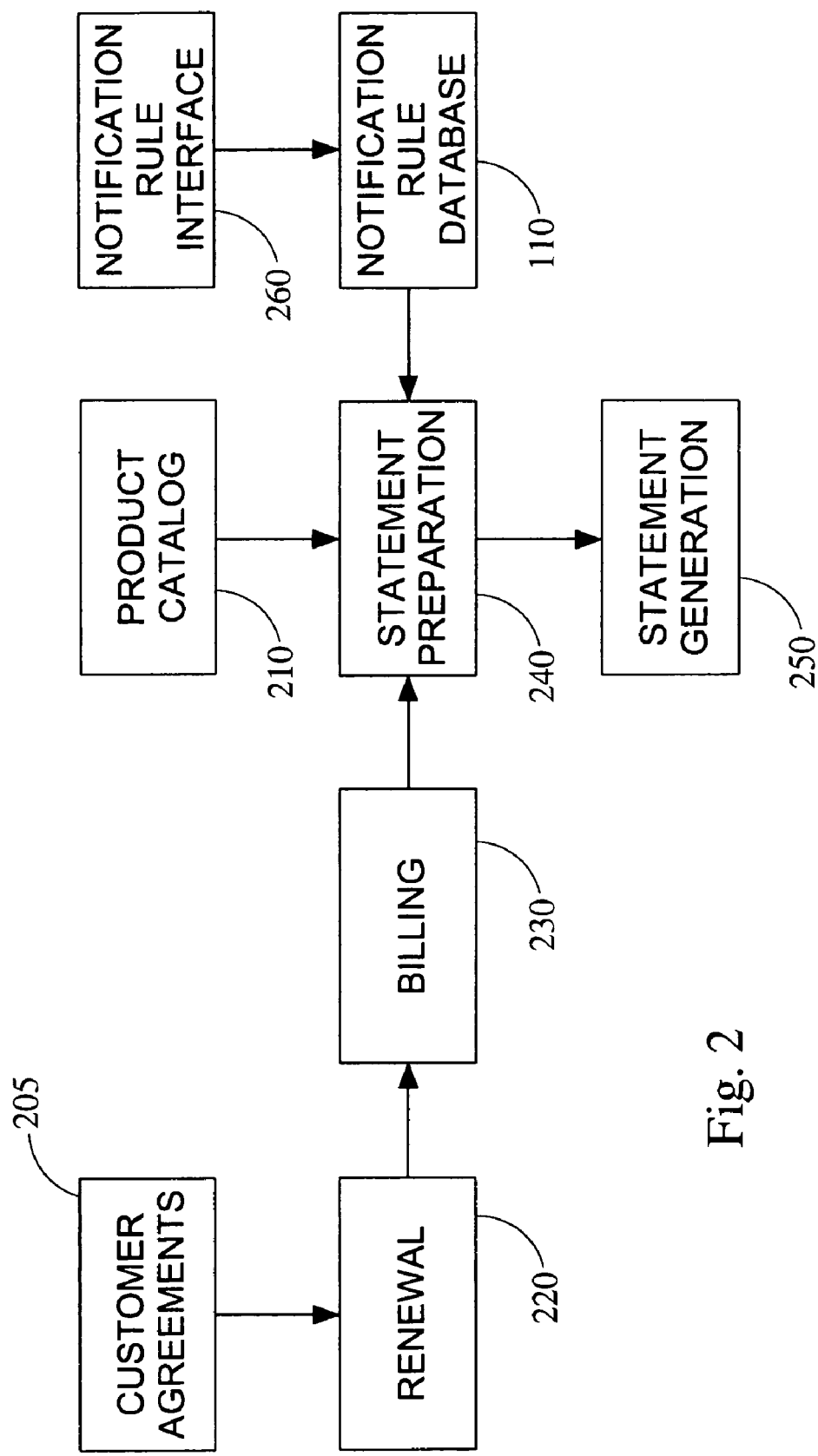
FIG. 2 is a block diagram of system components that may be used in generating customer statements with notifications tailored to individual customers.

FIG. 2 is a block diagram of system components that may be used in generating customer statements with notifications tailored to individual customers. The blocks include information on customer agreements 205, information regarding a provider's product catalog 210, a renewal engine 220, a billing engine 230, a statement preparation engine 240, a procedure for statement generation 250, and a notification rules interface 260. The notification rule database 110 from FIG. 1 may be used to provide information on notification rules to the statement preparation engine 240. Various blocks depicted in FIG. 2 may be implemented in software and stored on the memory 104 from FIG. 1. For example, the billing engine 230 and the statement preparation engine 240 may be implemented as software such as the billing software 116, and the statement preparation software 118, respectively. Similarly, the customer agreements 205 and the product catalog 210 may be stored among the customer data 112 and the product data 114.

The customer agreements 205 are records of the financial understandings between providers and customers. The customer agreements 205 may be comprised in a database for a single provider, and be maintained by that provider. Alternatively, the customer agreements 205 may include a collection of information for several providers, and may be maintained by a billing service that supports the several providers. The customer agreements 205 may include information such as product descriptions, product prices, discounts, fees, terms of service, account history, account status, and other information.

The various subscription services and other business services being offered may be categorized in the product catalog 210. The product catalog 210 may be an inventory of the services for an entire enterprise. Products may be listed in the product catalog with descriptions and price information. The price information may include recurring fees, such as monthly fees for the products, and one-time fees, such as activation fees. The price information may also include discounts, such as one-time discounts, recurring discounts, or specialized discounts with their own charging instructions.

The customer agreements 205 may include information regarding financial understandings between retailers and customers, such as product descriptions, product prices, discounts, fees, and other information. Additional software may be used to monitor and maintain the information on customer agreements 205. The monitoring and maintenance software may be implemented in parallel with or as part of the renewal engine 220. For example, the renewal engine 220 may monitor the commitments on a customer product. If required, the renewal engine 220 may determine commitment penalties in situations where a customer has canceled a service before a pre-agreed amount of time. For example, if a customer cancels a subscription before completing a minimum required subscription period, the customer may be assessed a penalty that would be recognized by the renewal engine 220, and processed by the billing engine 230 and the statement preparation engine 240.

The renewal engine 220 is configured to review the customer agreements 205 periodically to determine which customers will have services renewed in an upcoming service period, or which customers may otherwise need to be provided a statement in an upcoming service period. The service period may be a unit of time such as a period of two weeks, thirty days, one month, six months, one year, five years, or other time periods.

The service period may correspond to a provider's billing cycle, so that the renewal engine 220 may gather appropriate information to be used in preparation of periodic billing statements. This information is then passed to the billing engine 230, which bills accounts appropriately for each statement period. As part of the billing function, the billing engine 230 provides statement information to the statement preparation engine 240, which assembles the information used in preparation of customer statements.

The statement preparation engine 240 receives the statement information from the billing engine 230. The statement preparation engine 240 refers to the product catalog 210 to look up information on the relevant products for each statement, and produces the final statement files. The statement files are then printed or emailed or otherwise delivered to customers by appropriate statement generation procedures 250.

The statement preparation engine 240 may prepare the output statements with appropriate notices to customers, using notification rules stored in the notification rule database 110. The notification rule database 110 may include notices with helpful information for customers reviewing billing statements. The notification rule database 110 may also include corresponding test conditions for each notice. The test conditions describe when a particular notice should be included on a billing statement, and indicates which customers should be provided with that particular notice.

The notification rule database may be created or maintained (or both) through the notification rule interface 260. The notification rule interface 260 may be configured to facilitate entry of information for statement notices and for specifying the conditions under which different notices are provided to customers. The notification rule interface 260 may be implemented as a text-based rules database, or through a variety of graphical interfaces. For example, the notification rule interface 260 may use several user-interface windows, such as a listing window that displays existing rules and an updating window that allows entry of new rules or modification of existing rules.

Figure 3:
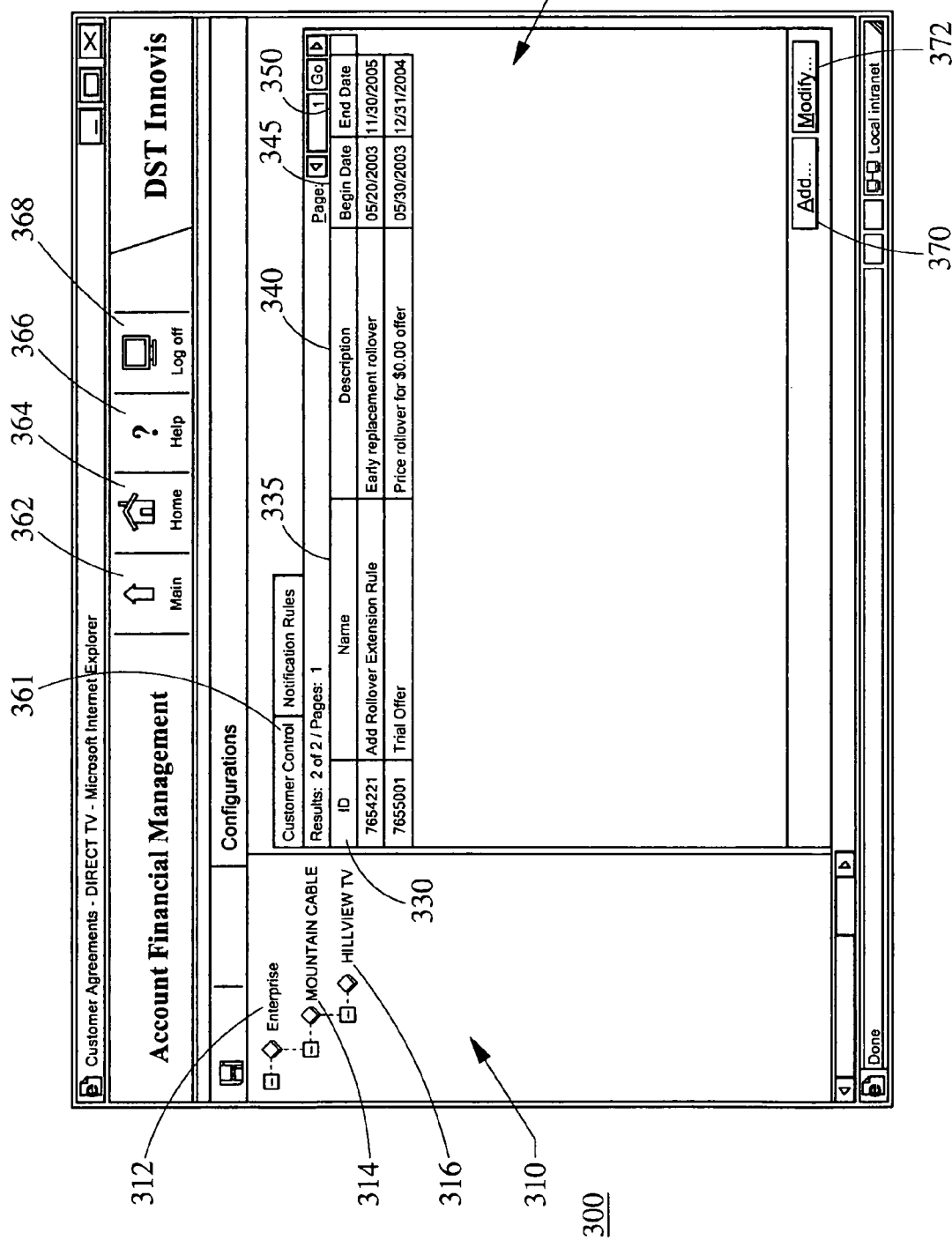
FIG. 3 illustrates a listing window for a notification rules interface.

FIG. 3 shows an example of a listing window 300 for a notification rules interface. The listing window 300 may be a component of the notification rule interface 260 from FIG. 2. The listing window 300 may include a provider panel 310 for selecting a provider whose notification rules need to be updated, and a rules panel 320 that lists notification rules defined for a selected provider. As illustrated, the listing window 300 may also include various tools for navigation and control. For example, the listing window 300 may include a button for switching to a main window 362, a button for switching to a home window 364, a button for invoking a help window 366, and a button for exiting 368 the listing window 300.

The provider panel 310 may provide a list of providers, so that a user may select a particular provider whose rules are to be updated. The list may have a tree structure, in which one service provider 316 is a subsidiary or "child" service provider under a "parent" service provider 314. Changes made to rules in parent providers 314 may be inherited into corresponding rules for child providers 316.

A tree structure may be particularly useful in providing billing notification support to service providers who may have a hierarchy of service-providing companies. For example, a parent company may provide service throughout a large geographical region, such as the southern section of a state. A child company may provide service in a more localized geographical region, such as a particular collection of suburbs. For example, a parent company may serve an entire nation, while a child company serves a metropolitan area in the nation.

Other structures may also be used for hierarchically organizing service providers in the provider panel 310. In addition to, or instead of, geographic hierarchies, providers may also be arranged in other hierarchical structures. For example, hierarchies may be structured according to types of services, such as identifying a parent that provides cable television and telephone services, and a child that provides only telephone services. Similarly, a hierarchy may be structured according to distributions of customers, such as by identifying a parent with a general list of subscribing customers, and a child that provides services to a select subset of the subscribers (eg.: high-volume subscribers, residential subscribers, or corporate subscribers, for example). Note that multiple levels of hierarchy may be implemented. Thus, a child provider may in turn be a parent for another provider.

The rules panel 320 displays a table for notification rules established by a provider, such as a retailer, selected in the provider panel 310. The rules panel may include additional navigation buttons, such as a button for adding a new rule 370 and a button for modifying a selected rule 372. As illustrated in FIG. 3, the rules panel 320 may display a list of rules in several columns. The columns may include an ID column 330, a name column 335, a description column 340, a begin date column 345, and an end date column 350, among others. The ID column 330 may indicate a system-generated identifier of the rule. In implementations where the ID is generated after a rule is saved to a database, the ID field may display a blank until the data is saved and the database refreshed. The name column 335 may indicate a user-generated name given to the rule. The description column 340 may include a brief text description of the rule. The begin and end date columns 345 and 350 may indicate starting and ending dates, respectively, for implementing the rule. Additional details of a notification rule in the listing window 300 can be viewed or modified via secondary screens, which may be invoked by a user through the modify button 372 or through other commands on the listing window 300.

Figure 4:
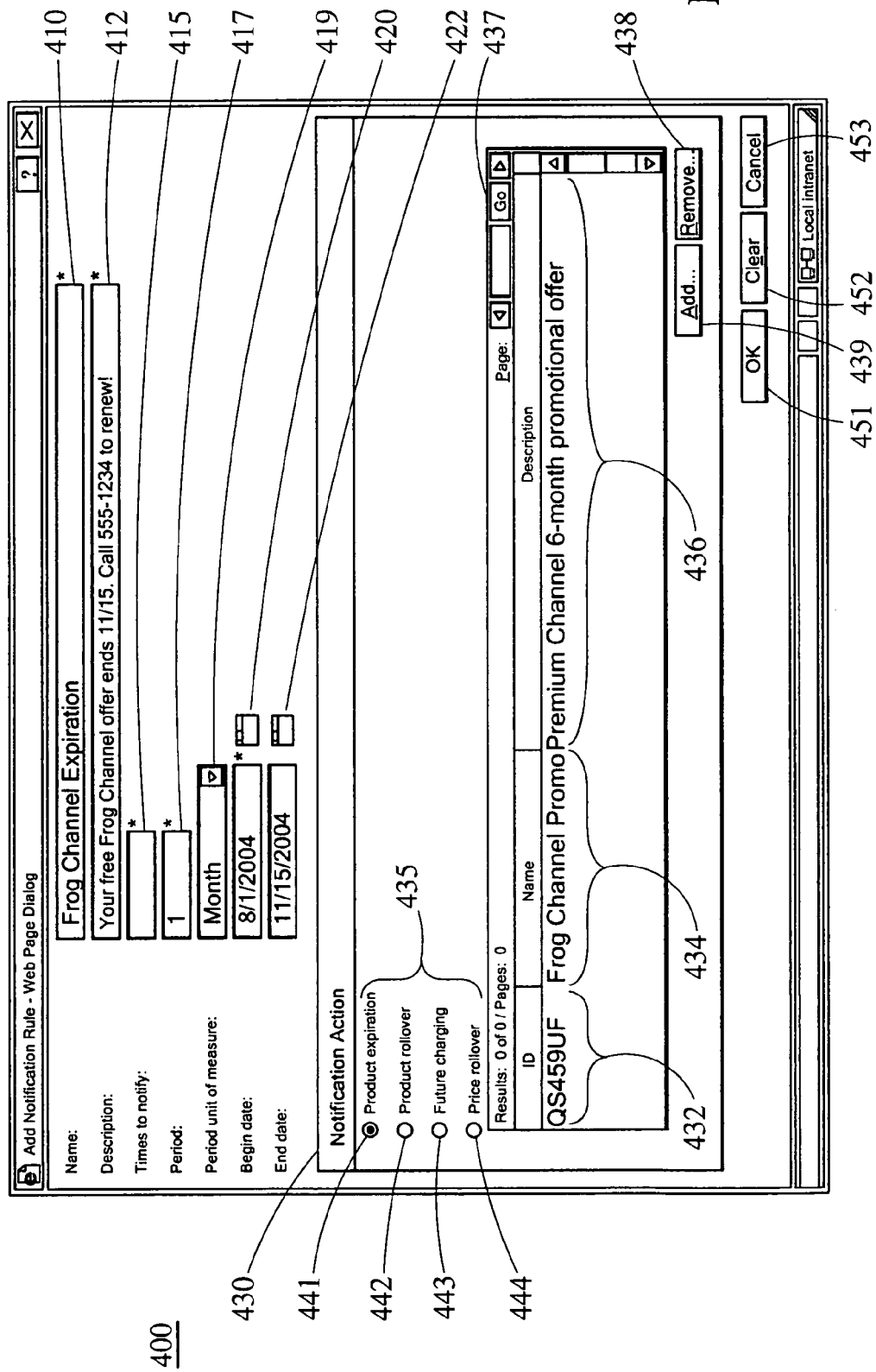
FIG. 4 illustrates an updating window for the listing window of FIG. 3, with a notification rule to alert customers of a product's expiration.

FIG. 4 shows an example of an updating window 400. A user may invoke the updating window 400 to edit an existing notification rule from FIG. 3 by selecting the rule and clicking on the modify button 372 in the rules panel 320. Alternatively, or in addition, the interfaces may be configured so that a user may double-click on a notification rule in the rules panel 320 to invoke the updating window 400 for that rule. To add a new rule, a user may click on the add button 370. Clicking on the add button 370 may invoke the updating window 400 with blank entries for all the fields, so that the user may enter the appropriate information for the new rule.

The fields in the updating window 400 may include a name field 410, a description field 412, a number-of-notifications field 415, a period-of-notifications field 417, a period duration field 419, a begin date field 420, an end date field 422, and an action panel 430. The updating window 400 may also include buttons to accept 451, clear 452, or cancel 453 the information that has been entered by a user since invoking the updating window 400.

The name field 410 allows a user to enter a textual name for an individual notification rule. The description field 412 allows room for a more extended explanation of the notification rule, and may also be used to store the text for a notice to appear on a customer's statement. The number-of-notifications field 415 allows a user indicate the number of times that the notification rule will be invoked, and is optional. This field 415 may be left blank if the notification is to be used for an indefinite period of time. The period-of-notifications field 417 indicates the amount of time between notifications. The unit of time for period of notification may be selected from a pull down menu in the period duration field 419. As an alternative to the number-of-notifications field 415, a user may enter a starting date and an ending date for the notification in the begin and end date fields 420 and 422.

To disable a notification rule, a user may make the rule obsolete by adding or changing the end date 422 of the rule. The system may be configured so that a notification rule becomes obsolete at midnight of the specified end date.

The action panel 430 allows a user to select the type of notification to be presented on a billing statement. In the illustrated example, the type of notification is selected through the election of one of several available radio buttons 435. The action panel 430 also includes a table 437 that lists products or price structures for which a notification should apply. The table 437 displays the products or price structures associated with the rule being created or modified in the updating window 400. On each row, the table 437 lists the applicable notification rules by an identifier 432, a name 434, and a description 436 of the products or price structures. By glancing at this table 437, a user may quickly determine which products or price structures will be subject to the notification rule being modified in the updating window 400.

A user may also add or remove products and price structures from the list of affected products and price structures. An add button 438 in the action panel 430 allows a user to select an additional product or price structure to which a notification rule may apply. A remove button 439 in the action panel 430 allows a user to remove a product or price structure from being subject to a notification rule. This button 439 is enabled when one or more rows in the table are selected.

The example shows an implementation in which a user may select among four different types of notifications. As illustrated by the radio buttons 435, the types of notifications in this example are notifications for product expiration 441, product rollover 442, future charging 443, and price rollover 444.

The first three of these types of notifications apply to products that are available to customers: product expiration, product rollover, and future charging. The last type of notification, price rollover, applies to price structures for products available to customers.

A product expiration rule causes a notice to be printed on a customer's statement to alert the customer that a product is about to expire. For example, a customer may have been provided a temporary subscription to a premium product called the Frog Channel. As illustrated by the entries in FIG. 4, a notification rule may be used to alert customers that this promotional offer will be ending. As illustrated in this example, an expiration notification rule may be created so that appropriate customers are notified on their monthly statements that the Frog Channel will no longer be available through the free promotion. This notification rule may be stored in the notification rule database 110 shown in FIGS. 1 and 2. This notification rule may then be used by the statement preparation engine 240 shown in FIG. 2 to include helpful notices on customer statements, alerting the subscribers that the temporary free subscription to the Frog Channel is being discontinued. In this illustrated example, the name 410 of the notification rule is "Frog Channel Expiration." As specified in the description field 412, the affected statements will include a notice saying, "Your free Frog Channel Offer ends November 15. Call 555-1234 to renew!" The notification will run every 1 month, starting on Aug. 1, 2004, and ending on Nov. 15, 2004, as indicated in the timing fields 417, 419, and 420, and 422. Since the ending date to provide the notice has been specified in the end date field 422, the number-of-notifications field 415 is redundant and has been left blank.

Radio button 441 has been selected, indicating that this rule alerts users to a product's expiration. As noted in the table 437, one product has been identified as being subject to this notification: the "Frog Channel Promo." Customers who have specifically subscribed to the Frog Channel promotional offer are the customers who will be given this notification.

As illustrated in the example of FIG. 4, the description field 412 allows a user to enter text for a notice to appear on a customer's statement. Other variations are also possible. For example, the updating window 400 may be modified so that a user may enter other types of notices, including non-textual notices, such as images. More generally, notifications may also be communicated using other media. Instead of, or in addition to statement-based notifications, notifications may be communicated to a user via email, voicemail, automated calling services, or a variety of internet-based or television-based tools to provide appropriate notifications to customers. As appropriate, the notifications may be text, images, sound clips, video clips, or have other forms, or may include a combination of various forms.

Figure 5:
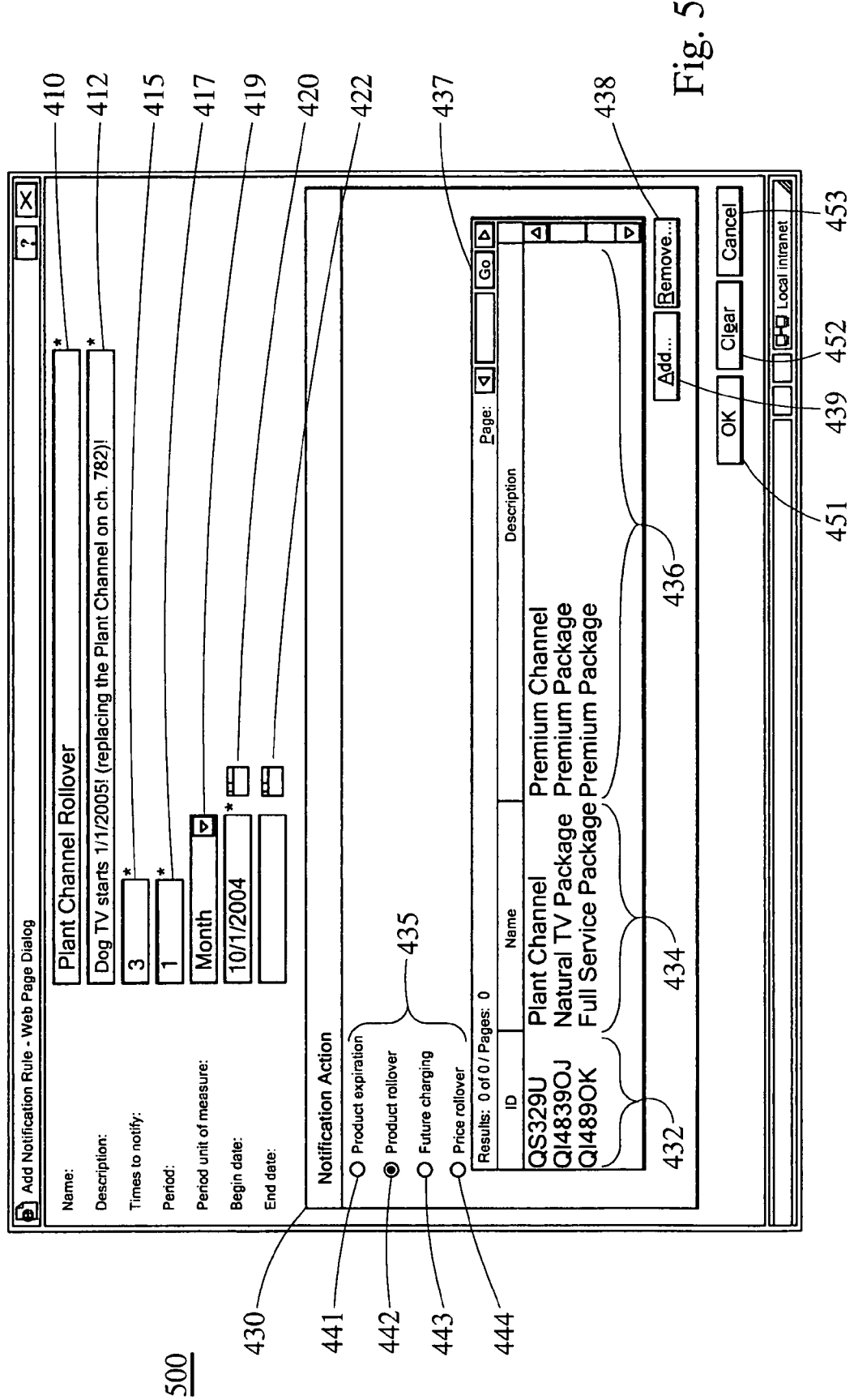
FIG. 5 illustrates an updating window with a notification rule to alert customers of a product rollover.

FIG. 5 illustrates an updating window 500 with a notification rule to alert customers of a product rollover. Product rollovers include situations in which a product is scheduled to be discontinued and replaced with an alternative product. Rollover situations may occur, for example, where a temporary subscription to a product package is expiring and will be replaced by a default product package. For example, a customer may be notified that "Your Expanded Basic Service will expire after this billing period, after which you will be billed at the Standard Basic rate of $25.99 per month."

In another example, illustrated in FIG. 5, a product rollover involves the replacement of a product called the Plant Channel by a new product, Dog TV, on a provider's channel no. 782. The rolled-over Plant Channel may be canceled for a variety of reasons: the producers may deem the product to be unprofitable, the suppliers may raise their prices charged for this product to the cable provider, or the cable provider may prefer to offer an alternative product, for example. In these situations, the cable provider may desire to provide advance notice to customers that the Plant Channel will be replaced. The example in FIG. 4 alters customers that "Dog TV starts Jan. 1, 2005 (replacing the Plant Channel on ch. 782)!"

In this illustrated example, the name 410 of the notification rule is "Plant Channel Rollover." As specified in the description field 412, the affected statements will include a notice that "Dog TV starts Jan. 1, 2005! (replacing the Plant Channel on ch. 782)!" The notification will run three times, once every 1 month, starting on Oct. 1, 2004, as indicated in the timing fields 415, 417, 419, and 420. Since the number of times to provide the notice has been specified in the number-of-notifications field 415, the end date field 422 is redundant and has been left blank.

Radio button 442 has been selected, indicating that this rule alerts users to a product rollover. Three products have been identified as being subject to this notification, as noted in the table 437. Customers who have specifically subscribed to the Plant Channel will be given this notification. Additionally, customers who subscribe to packages that include the Plant Channel (either the "Natural TV Package" or the "Full Service Package") are also listed as needing this notification.

Various other notification rules are contemplated, such as a future charging 443 notification rule and a price rollover 444 notification rule. A future charging notification rule may be used to alert a customer of a new charge that will be assessed in the future. This type of notification rule may be used near the end of a promotional free offer. For example, a notice may be specified in the description field 412 that "Your NFL Ticket will begin charging on your next billing period, at a rate of $19.99 per month." This notice would appear on a customer's statement at an appropriate time (or times) indicated by the timing fields 415, 417, 419, 420, and 422. This future charging notice may be identified by the future charging radio button 443.

Yet another example of a notification rule is a price rollover 444 notification rule, indicated by the price rollover notification button 444. This type of notification rule applies to notices of price structures rather than to notices of specific products, and may be used when the price of a customer's product is about to change. For example, a notice may be specified in the description field 412 that "Your promotional HBO service will expire after this billing period, after which you will be billed the full price of $18.00 per month." This notice would appear on a customer's statement at an appropriate time (or times) indicated by the timing fields 415, 417, 419, 420, and 422.

A variety of alternatives are possible for the above examples of user interfaces. For example, in the above examples, the notification that appears on customers' statements is determined by the text provided in the description field 412. Alternatively, or in addition, the notification may be input by the user in an interface window separate from the updating windows 400 or 500. Examples of alternatives to the description field 412 are shown in FIGS. 6 and 7.

Figure 6:
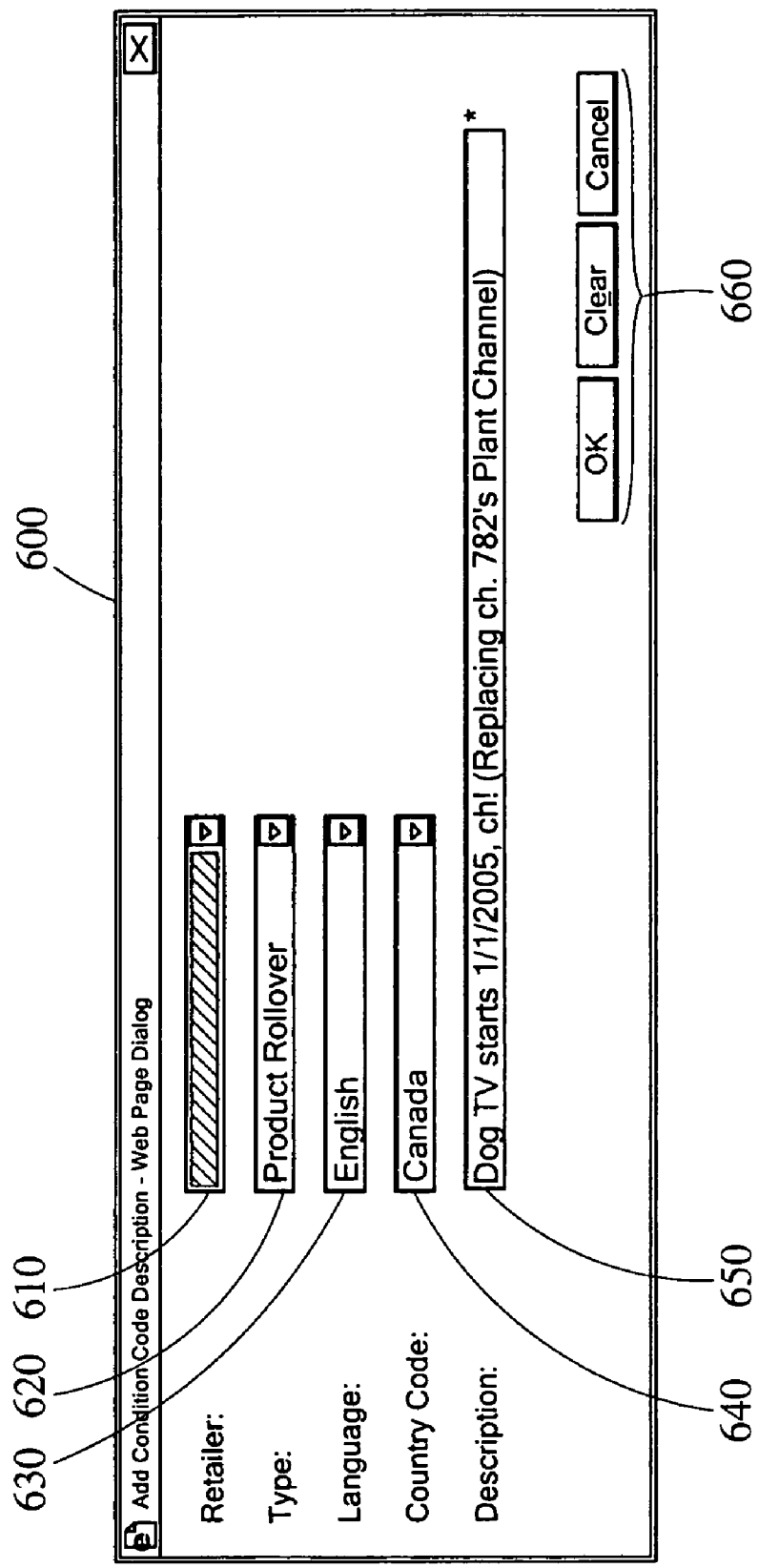
FIG. 6 illustrates a description-entry dialog box with language flexibility.
Figure 7:
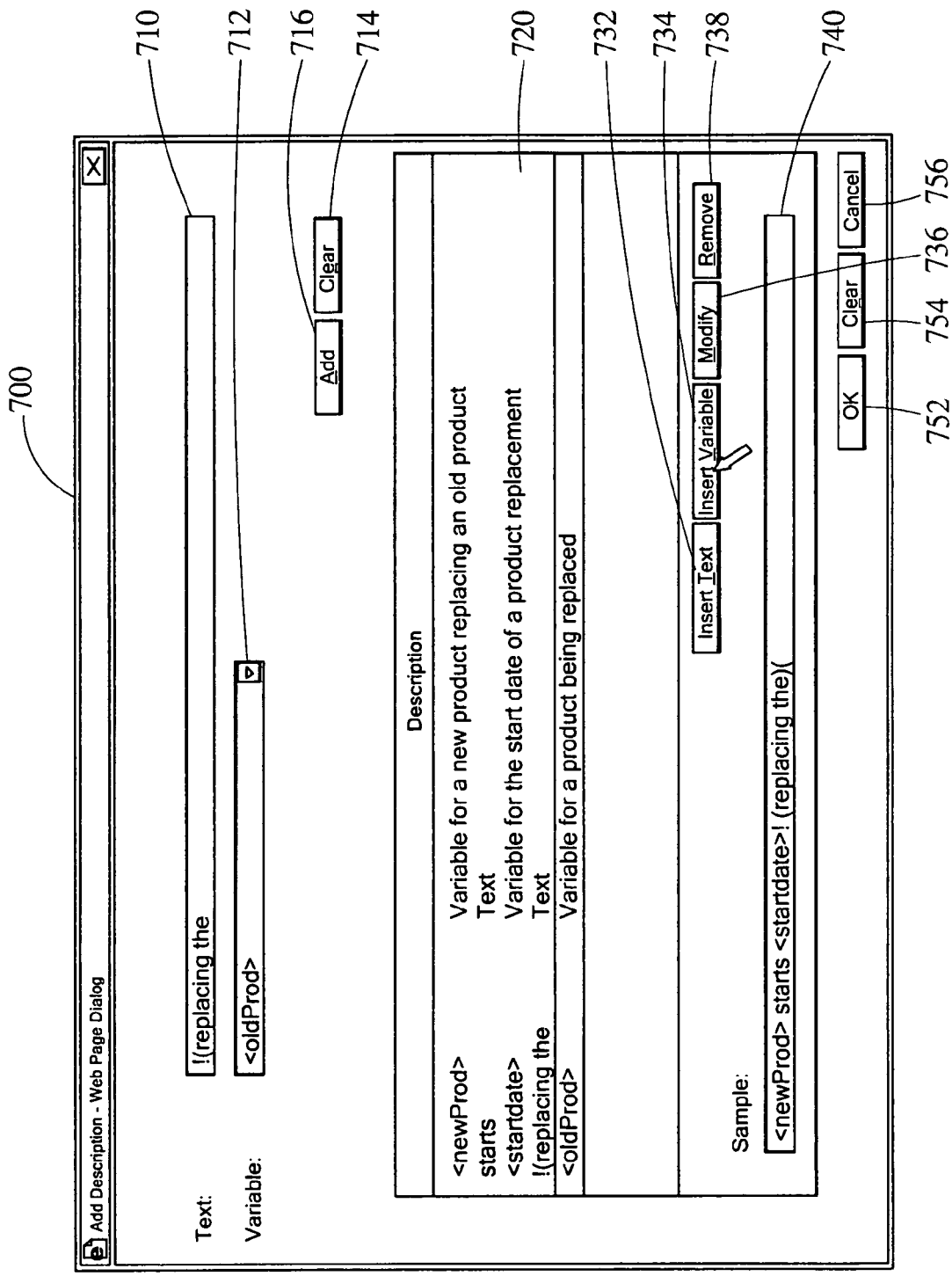
FIG. 7 illustrates a description-entry dialog box with for dynamic notifications.

FIG. 6 illustrates a description-entry dialog box 600 with language flexibility. This dialog box 600 may be used in implementations of a notification system that replace the description field 412 (from FIGS. 4 and 5) with more flexible tools for defining a notification message. For example, the description field 412 may be replaced by a button (not shown) that invokes the dialog box 600.

The dialog box 600 includes a retailer field 610, a type field 620, a language field 630, a county field 640, a description field 650, and confirmation buttons 660. The retailer field 610 allows a user to select a retailer for whom the product description will be applicable. The type field 620 allows a user to select the type of notification that is being created. The available types of notification may correspond to the types of notification discussed above with reference to radio buttons 435, so that a user may select a notification for product expiration, a notification for product rollover, a notification for future charging, or a notification for price rollover. The description field 650 allows a user to view, enter, or edit notification text to be printed on a customer statement.

The language field 630 allows a user to identify which of several languages is being entered into the description field 650. The county field 640 allows a user to identify which of several national or regional dialects is being entered into the description field 650.

The description field 650 allows multiple entries: one for each combination of language and dialect specified by the language field 630 and the county field 640. Thus a user may enter one version to be used for customers in the United states by selecting "English" in the language field 630, selecting "United States" in the county field 640, and entering the appropriate US description in the description field 650. The user may then change the country field 640 to "Canada" and enter an alternative Canadian description in the description field 650. The various different descriptions may then be used as appropriate, depending on the geographical location of different customers receiving the notification.

The confirmation buttons 660 allow a user to conclude an entry into the description field 650 by accepting the entry ("OK"), clearing the entry ("Clear"), or canceling all modifications ("Cancel").

FIG. 7 illustrates a description-entry dialog box 700 for dynamic notifications. This dialog box 700 allows a user to enter an automated notification using variables (or text fields) to indicate portions of a notification that may change from situation to situation. For example, a user may wish to have more flexibility than using static text such as the notification illustrated in FIG. 5:

> Dog TV starts 1/1/2005! (replacing the Plant Channel on ch. 782)!

For example, a user may wish to create a more generic notification that may be adapted to product replacements in general. In such a situation, the name of the new channel, the name of the old channel, and the date of the replacements would need to be information that changes from situation to situation. With this flexibility, a user could use the same notification entry to automate the notification of future replacements. An example of such a dynamic notification may take the form:

> <newProd> starts <startdate>! (replacing the <oldprod> on ch. <ch-num>)!

This dynamic notification may be used to automate the generation of notifications. For example, by appropriately replacing the variables <newProd>, <startdate>, <oldprod>, and <ch-num> with database values of "Nature Video," "Feb. 3, 2005," "NewsTV", and "45," an automated system could readily generate a new notice:

> Nature Video starts 2/3/2005! (replacing the NewsTV on ch. 45)!

In this example, the notification includes text and variables, with the variables identified in angle brackets. (Other variable delimiters are also possible, such as the use of an initial ampersand (&newProd) or surrounding asterisks (*newProd*), for example, as well as iconic or other non-textual indicators of variables.) The example dialog box 700 illustrates components for entering variables and text for a dynamic textual notification. The dialog box 700 includes a text-entry field 710, a variable-selection field 712, a description window 720, and a sample window 740. The dialog box 700 includes buttons for selecting and editing text and variables: an add button 716, a clear button 714, an insert-text button 732, an insert-variable button 734, a modify button 736, and a remove button 738. The dialog box 700 also includes buttons for concluding the entry of a description: an OK button 752, a clear button 754, and a cancel button 756.

The text-entry field 710 allows a user to enter segments of text that may be used in a notification. A text segment may be the "! (replacing the" segment from the above example. The variable-selection field 712 allows a user to select a variable that may be used in a notification. A variable may be the "<oldProd>" variable from the above example. The description window 720 lists the text segments and variables that have been selected by a user for use in a notification. In the illustration of FIG. 7, a user is in the process of entering the text and variables discussed in the example. The description window may include an brief description of the variables that have been selected.

The sample window 740 shows the text and variables, arranged in the order chosen by the user for the dynamic notification. The sample window 740 may use the text and variables that are specified in the description window, but may include repetitions where a user has chosen to repeat one or more variables at different points in a notification message.

The add button 716 allows a user to add a text segment or a variable into the description window 720 from the text-entry field 710 and the variable-selection field 712. The clear button 714 clears the text-entry field 710 and the variable-selection field 712.

The insert-text button 732 and the insert-variable button 734 allows a user to insert text and variables from the description window 720 into the dynamic notification shown in the sample window. The modify button 736 and the remove button 738 allow a user to edit or delete text and variables in the description window 720.

The OK button 752 allows a user to conclude the successful creation or editing of a dynamic notification by saving the notification and exiting the dialog box 700. The clear button 754 allows a user to restart the creation of a dynamic notification. The cancel button 756 allows the user to exit the dialog box 700 without saving any edits made in a session.

Other alternatives and variations are also possible in the layout and design of the user interfaces for statement notifications. Also, variations are possible in the manner that notifications are provided to customers. For example, the notifications may be output on billing statements simply at the bottom of the billing statements or in the margins of the billing statements. Alternatively, the notifications may be output on billing statements so that they appear at sensible locations on the customers' statements. For example, it would be helpful to customers to see a notice in a location adjacent to the line item being affected by the notice. Thus, a price rollover notice stating that "Your promotional HBO service will expire after this billing period, after which you will be billed the full price of $18.00 per month," may be placed on the statement immediately below a statement line that reads "Aug. 1, 2004-Aug. 31, 2004 . . . HBO Service . . . $15.00." Similar positioning of notices may also be used for product expiration notices and for product rollover notices. (Since future charging notices apply to line items for which no charge is currently assessed, it may not be possible to place future charging notices next to a relevant line item on a statement. Thus, future-charging notices may otherwise be prominently displayed on a customer statement.)

In addition to printer statement notifications, other types of notifications are also possible. For example, notifications may be transmitted in electronic form by email or voicemail. Notifications may also take the form of graphical images, transmitted by email or pop-up window to a subscriber's computer, or by a video channel directly to a customer's television.

It is intended that the foregoing detailed description be regarded as illustrative rather than limiting, and that it be understood that it is the following claims, including all equivalents, that are intended to define the spirit and scope of the invention.

The invention claimed is:

1. A computer implemented method for preparing customer billing statements by a provider of subscription services, the method comprising:
   retrieving, into a computer-readable memory, information for a customer from a customer database coupled to a data processing system comprising the computer-readable memory and a processor coupled to the memory;
   retrieving, into the memory, a set of notification rules, and validating the notification rules for validity subsequent to retrieving the set of notification rules,
   wherein the notification rules relate to one or more of products, services, and changes to the products or services of the provider;
   identifying, using notification rules logic included in a notification rules database, a notification rule that applies to the information for the customer, where the notification rule indicates whether the notification rule is for a subsidiary of a parent company;
   linking, using a notification rule interface coupled to the processor and memory through the notification rules database, the identified notification rule with a charge description, wherein the charge description comprises an image text, sound clips or video;
   generating, using statement preparation logic and a statement generation engine stored in the memory, statement information for the customer; and
   modifying, in the memory, the statement information to include the charge description in order to obtain a billing statement such that the customer is able to view the charge description upon presentation of the billing statement.

2. The method of claim 1, where the act of linking the identified notification rule with the charge description comprises:
   associating a charge for a customer product with a product notification description type, where the customer product is a product of the subsidiary of the parent company.

3. The method of claim 1, wherein the identified notification rule is a product expiration rule,
   wherein linking the identified notification rule with the charge description further comprises associating a charge for a customer product with a product notification description type; and
   wherein the billing statement further includes a product expiration message.

4. The method of claim 1, wherein the identified notification rule is a product rollover rule;
   wherein linking the identified notification rule with the charge description further comprises associating a charge for a customer product with a product notification description type; and
   wherein the billing statement further includes a product rollover message.

5. The method of claim 1, wherein the identified notification rule is a price rollover rule;
   wherein linking the identified notification rule with the charge description further comprises associating a charge for a customer product with a price notification description type; and
   wherein the billing statement further includes a price rollover message.

6. The method of claim 1,
   wherein validating the notification rule comprises determining whether a current date is between a start date and an end date of the notification rule.

7. The method of claim 1, wherein the notification rules include a geographical location of the customer notification rule, and wherein the geographical location of the customer notification rule is linked to the charge description.

8. The method of claim 1, wherein the notification rules include a national language and a regional dialect of the customer notification rule, and wherein the national language and a regional dialect of the customer notification rule is linked to the charge description.

9. The method of claim 1, wherein the notification rules comprise:
   a notification rule name specifier;
   a notification rule identifier;
   a notification rule presentation frequency specifier;
   a notification rule presentation time period specifier;
   a notification rule presentation start date specifier;
   a notification rule presentation end date specifier;
   a notification rule product identifier; and
   a notification rule charge description.

10. The method of claim 9, wherein the notification rules are from a group consisting of:
    a product expiration rule;
    a product rollover rule that indicates that a product is scheduled to be a discontinued product that will be replaced by an alternative product;

a future charging rule that indicates a new charge that will be assessed in the future following a promotional period; and a price rollover rule that applies a price structure to multiple products.

11. The method of claim 10, wherein modifying the billing statement further comprises including a product expiration message in the charge description during a specified time period as specified by the notification rule presentation time period specifier, and wherein the product expiration rule links to the product expiration message.

12. The method of claim 10, wherein modifying the billing statement further comprises including a product rollover message in the charge description during a specified time period as specified by the notification rule presentation time period specifier, and wherein the product rollover rule links to the product rollover message.

13. The method of claim 10, wherein modifying the billing statement further comprises including a price rollover message in the charge description during a specified time period as specified by the notification rule presentation time period specifier, and wherein the price rollover rule links to the price rollover message.

14. A computer implemented method for preparing customer billing statements by a provider of subscription services, the method comprising:

retrieving, into a computer-readable memory, information for a customer from a customer database coupled to a data processing system comprising the computer-readable memory and a processor coupled to the memory;

retrieving, into the memory, a set of notification rules, wherein the notification rules relate to one or more of products, services, and changes to the products or services of the provider;

identifying, using notification rules logic included in a notification rules database, a notification rule that applies to the information for the customer, where the notification rule indicates whether the notification rule is for a subsidiary of a parent company;

linking, using a notification rule interface coupled to the processor and memory through the notification rules database, the identified notification rule with a charge description comprising an image, text, sound clips, or video, by associating a charge for a customer product with a product notification description type, where the customer product is a product of the subsidiary of the parent company, generating, using statement preparation logic and a statement generation engine stored in the memory, statement information for the customer; and modifying, in the memory, the statement information to include the charge description in order to obtain a billing statement such that the customer is able to view the charge description upon presentation of the billing statement.

* * * * *